United States Patent [19]

Hosoi et al.

[11] 4,370,685

[45] Jan. 25, 1983

[54] HEAD TRACKING CONTROL SYSTEM FOR A HELICAL SCAN VTR

[75] Inventors: Sadao Hosoi, Ebina; Masayuki Takano, Hon, both of Japan

[73] Assignee: Sony Corporation, Tokyo, Japan

[21] Appl. No.: 243,352

[22] Filed: Mar. 13, 1981

[30] Foreign Application Priority Data

Mar. 13, 1980 [JP] Japan ............................. 55-31900

[51] Int. Cl.³ .................... G11B 21/10; G11B 5/52
[52] U.S. Cl. .................................. 360/77; 360/73; 360/70; 360/10.2
[58] Field of Search ............... 360/77, 70, 73, 10; 358/4, 8

[56] References Cited

U.S. PATENT DOCUMENTS

| | | | |
|---|---|---|---|
| 3,663,764 | 5/1972 | Trost et al. | 360/70 |
| 4,165,523 | 8/1979 | Hathaway | 360/77 |
| 4,287,538 | 9/1981 | Sakamoto et al. | 360/10 |
| 4,307,417 | 12/1981 | Tokuyama | 360/70 |
| 4,308,560 | 12/1981 | Ravizza | 360/73 |
| 4,328,518 | 5/1982 | Kawata et al. | 360/10 |

Primary Examiner—Alfred H. Eddleman
Attorney, Agent, or Firm—Lewis H. Eslinger; Alvin Sinderbrand

[57] ABSTRACT

A video tape recording/reproducing apparatus for reproducing video signals recorded in successive parallel tracks on a magnetic tape which is adapted to be longitudinally advanced, includes first and second magnetic heads movable in a direction generally along the tracks for reproducing signals recorded therein, and first and second bi-morph leaves for mounting the magnetic heads and being operative to deflect the first and second heads, respectively, in a direction transverse to the direction along the tracks. During the scanning operation by the respective heads, the first and second bi-morph leaves are supplied with a dithering signal for wobbling the heads transversely with respect to the longitudinal direction of the record tracks, a tracking error signal to correct deviations of the head trace from the tracks to be scanned and a slant angle correction signal to correct any inclination tracking error of the first and second magnetic heads. During the non-scanning operation by the heads, a phase error correction signal is supplied to the bi-morph leaves for deflecting the magnetic heads to accurately scan the beginning of the tracks. When the longitudinal speed of the magnetic tape exceeds, in the forward direction, a speed of 2.5 times the recording speed and, in the reverse direction, a speed of 0.5 times the recording speed, an offset signal forming circuit produces an offset signal which is supplied to the bi-morph leaves during the non-scanning operations of the magnetic heads to further deflect the heads by one track pitch in the negative and positive directions, respectively, so as to maintain the operation of the bi-morph leaves in the linear operating range thereof whereby to increase the ramp of possible tape reproducing speeds to direction, 3 times the recording speed when reproducing in the forward direction, and to the recording speed when reproducing in the reverse direction.

23 Claims, 42 Drawing Figures

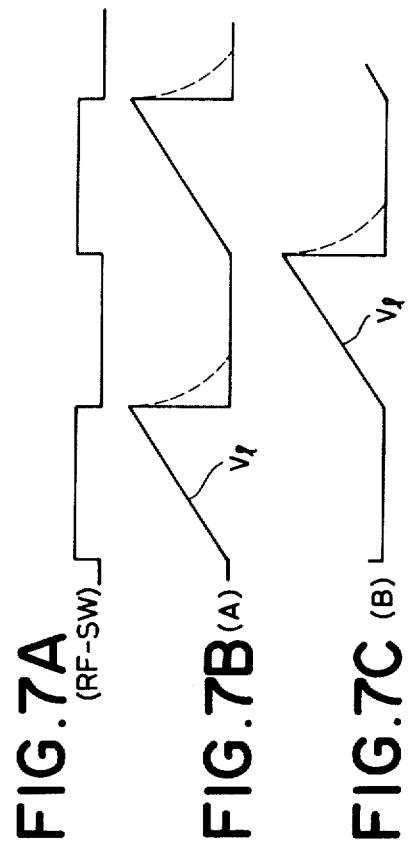
FIG.7A (RF-SW)
FIG.7B (A)
FIG.7C (B)
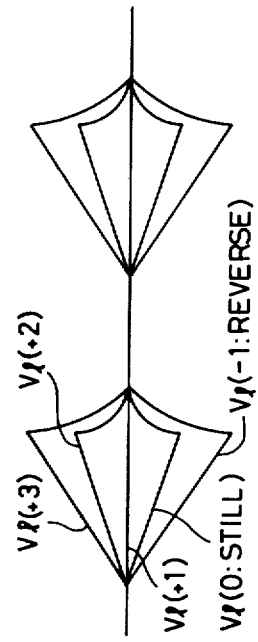
FIG.8

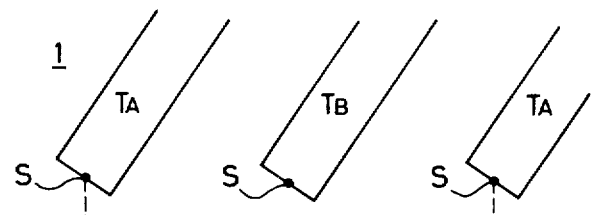

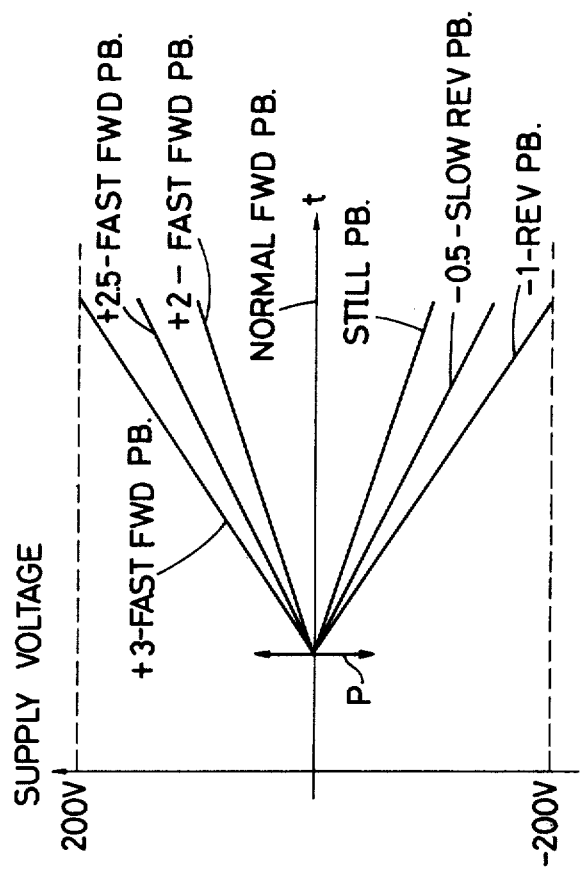

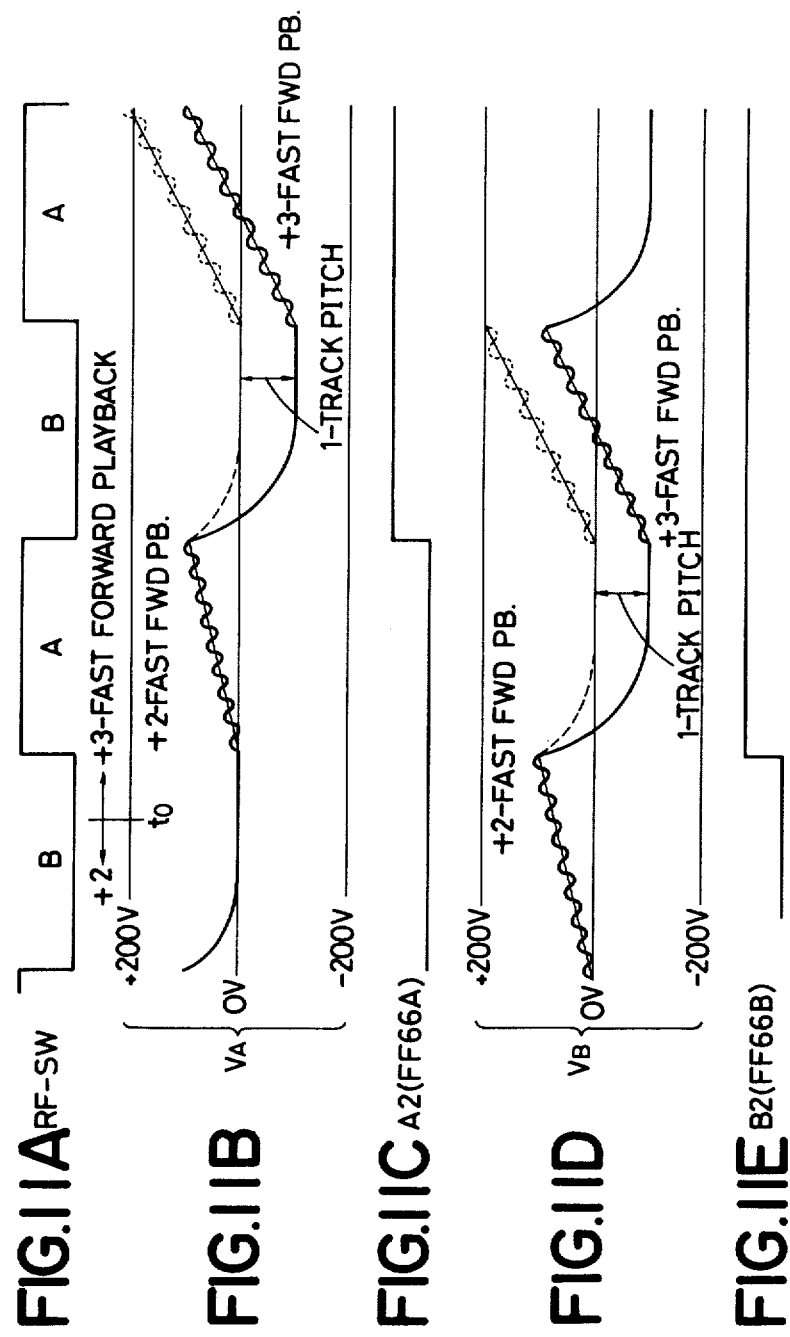

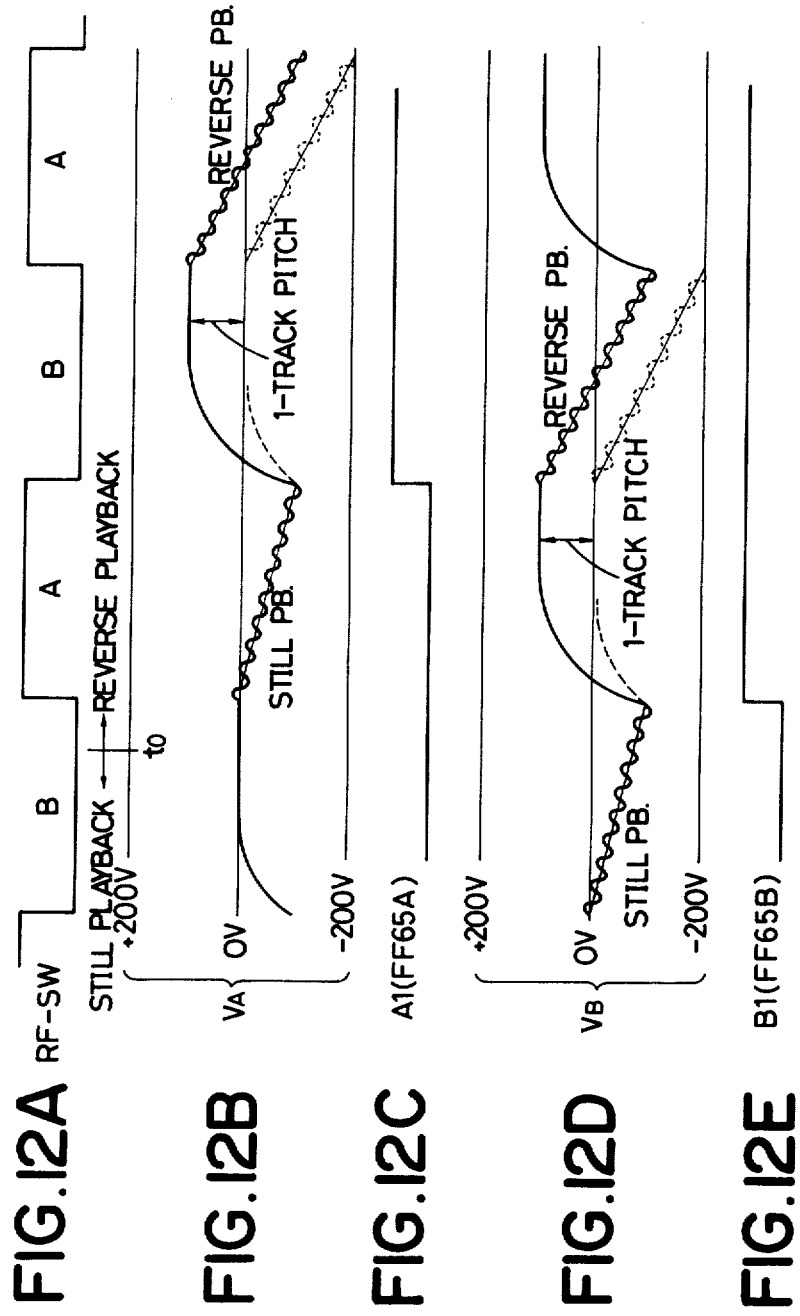

HEAD TRACKING CONTROL SYSTEM FOR A HELICAL SCAN VTR

BACKGROUND OF THE INVENTION

1. Field of the Invention

This invention relates generally to apparatus, such as a video tape recorder (VTR) of the so-called "helical-scan type", in which video or other information signals are recorded in successive parallel tracks which are skewed or extend obliquely on a magnetic tape and, more particularly, is directed to an improved tracking control system by which a magnetic head or other transducer in such apparatus is made to accurately scan the track or tracks in which the video or other information signals are recorded.

2. Description of the Prior Art

In a helical-scan VTR, the magnetic tape extends helically about at least a portion of the periphery of a guide drum and is adapted to be moved or advanced in the longitudinal direction of the tape while at least a portion of the guide drum is rotated, and the transducer or magnetic head is mounted on a rotated portion of the guide drum so as to rotate with the latter and thereby repeatedly scan across the tape in a path at an angle to the longitudinal direction of the tape. During the recording operation of the VTR, the angle between the scanning path, and hence each record track, and the longitudinal direction of the tape is dependent on the rotational speed of the rotary head and also the speed at which the magnetic tape is longitudinally advanced. Accordingly, if the speed and direction of advancement of the magnetic tape are not the same during the reproducing operation as during the recording operation, then the scanning path of the magnetic head during reproducing will not precisely follow or coincide with a record track or the tape during each movement of the head across the tape and, accordingly, the recorded video or other information signals may not be correctly or accurately reproduced.

Various tracking control or servo systems have been proposed for maintaining correct tracking or scanning of the record tracks by the rotary head. In the most desirable of these known arrangements, means are provided for deflecting the head in a direction normal to the plane of its rotation, that is, in a direction which is transverse in respect to the direction along each of the record tracks, and the amount of such deflection is electrically controlled during the movement of the head along each track so as to achieve accurate scanning of the latter. In published Japanese Patent Application No. 9919/1974 (Applicant: Matsushita Electric Industrial Company, Limited), it is generally disclosed to control the amount of deflection of the head in the direction normal to its plane of rotation in dependence on the difference between the speeds of advancement of the tape during the recording and reproducing operations so as to theoretically make possible the correct reproduction of the recorded video signals in the still-motion mode in which the tape is at rest, in the slow-motion mode in which the speed of advancement of the tape is, for example, $\frac{1}{4}$ or $\frac{1}{2}$ the tape speed for the recording operation, and in the quick-motion mode in which the speed of advancement of the tape is substantially greater than, for example, 2 times, the tape speed, for the recording operation. Further, in published Japanese Patent Application No. 117,106/1977 (Applicant: Ampex Corporation), it is disclosed to detect the amount of deflection of the head required for accurately scanning a record track thereby, and, when the detected deflection approaches the physical limit of that possible with the transducer deflecting device supporting the head, the electrical drive signal for the transducer deflecting device is controlled to cause the head to scan the next adjacent record track, that is, to effect a so-called "track jump". By reason of such "track jump" it is theoretically possible to effect correct slow-motion reproduction and also reverse-motion reproduction in which, for example, the tape is advanced longitudinally at the same speed as for the recording operation, but in the reverse or opposite direction.

However, in many existing tracking control or servo systems, the amplitude of the deflection of the rotary head or transducer by its transducer deflecting device is not optimized, that is, the maximum required deflection of the head in the non-normal reproduction mode, for example, the still-motion, slow-motion, fast-forward and reverse-motion modes, is not minimized. In U.S. Patent Applications Ser. Nos. 06/073,246, now U.S. Pat. No. 4,287,538, 06/152,117, and 06/232,014, filed Sept. 6, 1979, May 21, 1980, and Feb. 6, 1981, respectively, all having a common assignee herewith, there is disclosed an automatic tracking control system which optimizes the amplitude of the deflection of the rotary head by its deflecting device for each of the non-normal reproducing modes. More particularly, in the foregoing automatic tracking control systems, the drive signal applied to the transducer deflecting device comprises a jump signal or track selection control signal for determining the starting position of the transducer or head and, thereby, the next desired track to be followed or scanned thereby, a dithering signal or oscillation, a track following error signal, and a slant angle correction signal. In this manner, the tracking error between the recorded track on the magnetic tape and the scanning path of the reproducing head is corrected to effect coincidence therebetween. A reproduced picture of high quality without any guard band noise can thus be obtained even when the tape speed is varied during various special reproducing modes, such as during slow-, still-, fast- or reverse motion-playback modes.

Generally, the transducer deflecting device in the above systems is constituted by an electro-mechanical element, such as a bi-morph leaf, which is constructed by laminating two piezo-ceramic leaves with at least one electrode plate, and which is deflected in accordance with a drive voltage supplied thereto. However, the range within which such bi-morph leaf can be linearly deflected is limited. This, of course, limits the range of the drive voltage that can be applied thereto, for example, in the range of ±200 V, to obtain such linear deflection. Since the amount of deflection that is necessary for correct scanning of the record tracks, is generally greater for higher tape speeds, the aforementioned linear deflection limitation consequently results in a limitation of the reproducing speed of the tape, such as in the fast-forward and reverse reproducing modes. For example, when the allowable range of the drive voltage applied to the bi-morph leaf is ±200 V, reproduction at speeds greater than −0.5 times the normal reproducing speed (in the reverse direction), that is, during slow-motion reverse playback, and greater than +2.5 times the normal reproducing speed (in the forward direction), that is, during fast-foward playback, cannot be accomplished without substantial deterioration of the reproduced picture.

OBJECTS AND SUMMARY OF THE INVENTION

Accordingly, it is an object of this invention to provide an apparatus for reproducing information signals recorded in successive parallel tracks on a record medium with an improved tracking control system that avoids the above-described problems associated with the prior art.

More particularly, it is an object of this invention to provide a tracking control system, as aforesaid, by which information signals recorded in successive parallel tracks on a record medium can be correctly reproduced in the various non-normal or special reproducing modes.

It is another object of this invention to provide a novel tracking control system which controls each bi-morph leaf to increase the permissible range of tape speeds available during reproduction.

It is still another object of this invention to provide a novel tracking control system which increases the permissible range of tape speeds during reproduction by adding an offset control voltage to each bi-morph leaf when the speed of the magnetic tape exceeds a predetermined range of speeds so as to further deflect each leaf during a preset operation thereof.

In accordance with an aspect of this invention, apparatus for reproducing information signals recorded in successive parallel tracks on a record medium while the latter is advanced at a predetermined speed in a direction at an angle to the direction along the tracks, includes transducer means movable along each of the tracks in a scanning path from a beginning end to a concluding end thereof for reproducing the signals recorded therein; transducer deflecting means for deflecting the transducer means in a direction transverse to the direction along the tracks; drive signal means for producing a drive signal for controlling the transducer deflecting means to deflect the transducer means to accurately move along the tracks during a scanning operation thereby; and phase compensation means for producing a phase compensation signal for controlling the transducer deflecting means to preset the transducer means to the beginning of tracks to be scanned during a non-scanning operation thereby, the phase compensation means including offset control means for producing an offset control signal as part of the phase compensation signal only when the speed of advancement of the record medium during reproducing is outside a predetermined range of speeds.

In a preferred embodiment of this invention, the transducer means includes first and second magnetic heads and the transducer deflecting means includes first and second bi-morph leaves. The offset control means includes a first comparator circuit for comparing a speed detected signal corresponding to the speed of advancement of the record medium during reproducing with a first reference signal for detecting when the speed of advancement exceeds the upper limit for example, in the forward direction of the range of speeds, a second comparator circuit for comparing the speed detected signal with a second reference signal for detecting when the speed of advancement exceeds the lower limit for example, in the reverse direction of the range of speeds, and four D-type flip-flop circuits, each supplied with one of the outputs of the first and second comparator circuits at respective D-input terminals thereof and with a position signal corresponding to the positions of the magnetic heads at a trigger input terminal thereof. The outputs of the flip-flop circuits are supplied to the bi-morph leaves during the respective nonscanning operations of the heads so as to maintain the operation of the bi-morph leaves within respective linear operating ranges thereof when the speed of advancement of the record medium during reproducing is outside the predetermined range of speeds.

The above, and other, objects, features and advantages of the present invention will be apparent from the following detailed description of an illustrative embodiment of the invention which is to be read in connection with the accompanying drawings.

BRIEF DESCRIPTION OF THE DRAWINGS

FIGS. 5A-5C are waveform diagrams used for explaining the operation of respective portions of the tracking control system shown in FIG. 2C;

FIGS. 7A-7C are waveform diagrams used for explaining the operation of respective portions of the tracking control system of FIG. 2C;

FIG. 8 is a waveform diagram showing various sawtooth shaped voltages produced by the tracking control system of FIG. 2C for various tape speeds;

FIGS. 9A-9L are waveform diagrams used for explaining the operation of the tracking control system of FIG. 2B;

FIG. 10 is a graphical diagram illustrating the drive voltages supplied to the bi-morph leaves for various tape speeds;

FIGS. 11A-11E are waveform diagrams used for explaining the operation of the tracking control system of FIG. 2 when the tape speed is increased in the forward direction from +2 to +3 times the normal reproducing speed; and FIGS. 12A-12E are waveform diagrams used for explaining the operation of the tracking control system of FIG. 2 when the tape speed is increased in the reverse direction from 0 to −1 times the normal reproducing speed.

DETAILED DESCRIPTION OF A PREFERRED EMBODIMENT

Figure 1:
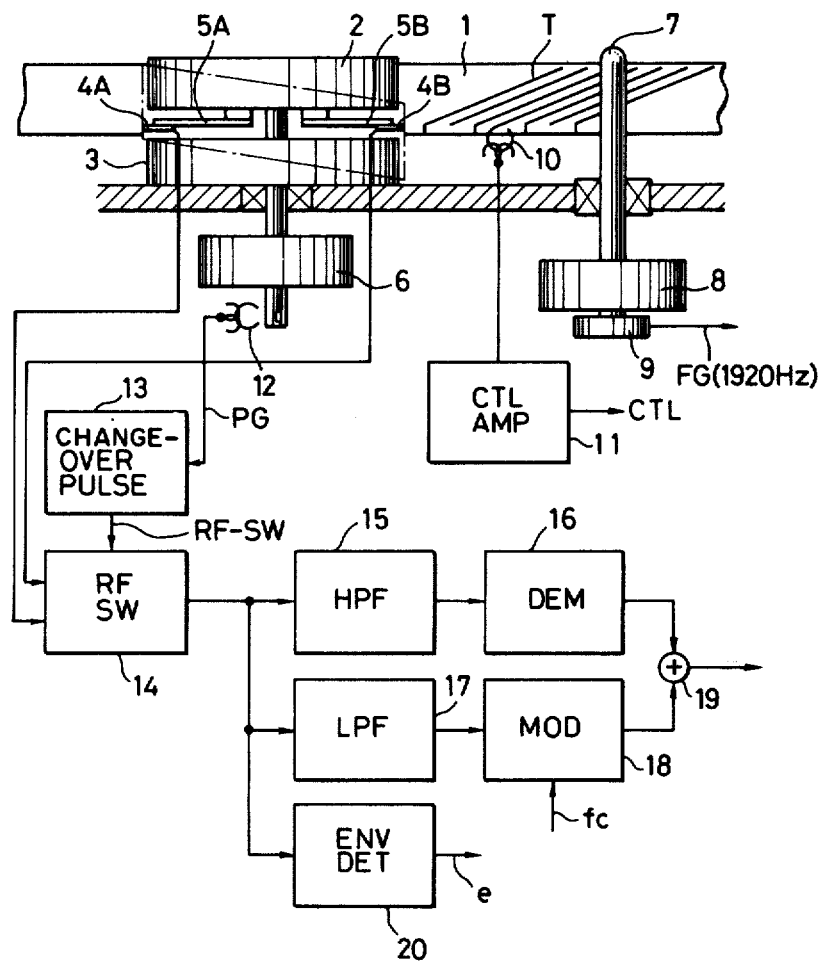
FIG. 1 is a side elevational view of a head drum assembly of a known video tape recorder (VTR) of the helical-scan type and a block diagram of a reproducing system for the VTR, with which a tracking control system according to this invention may be employed.

Referring to the drawings in detail, and initially to FIG. 1 thereof, there is shown a rotary head drum assembly of a known two-head VTR of the helical-scan type. The rotary head drum assembly is shown to include an upper rotary drum 2 which is rotated through a drive shaft by a drum motor 6, and a lower stationary drum 3 which is fixed on a chassis of the VTR concentric with the drive shaft so as to be opposite upper drum 2 with a small gap therebetween. A pair of magnetic heads 4A and 4B are attached on the lower surface of upper drum 2 through bi-morph leaves 5A and 5B, respectively, and are spaced apart by 180°.

A magnetic tape 1 is wrapped helically around the outer peripheries of upper drum 2 and lower drum 3 over an angular range of about 180°. During the recording operation, the tape is advanced longitudinally at a predetermined speed by a pinch roller (not shown) and a capstan 7, the latter being rotated at a predetermined speed by a capstan motor 8. At such time, upper rotary drum 2 and heads 4A and 4B attached thereto are also rotated so that video or other information signals are recorded by rotating heads 4A and 4B in a series of parallel magnetic tracks T at a predetermined slant angle to the longitudinal direction of the tape 1, as shown in FIG. 1. In addition, control pulses CTL are recorded along the lower edge of the tape for indicating the track positions on the tape.

In the playback or reproducing operation with the tape being transported at the recording speed, an accurate video signal can be reproduced with a tracking servo system which includes a drum servo and/or capstan servo for adjusting the rotary drum phases of the heads 4A and 4B so as to make the heads correctly trace or scan the successive record tracks. In a playback mode employing an arbitrary tape speed which is different from the recording speed, both the phase and slant angle of the head scanning path do not coincide with the phase and slant angle, respectively, of the recorded tracks T. Therefore, in the arbitrary speed playback mode, the vertical positions of heads 4A and 4B must be changed by deflection of bi-morph leaves 5A and 5B in a direction normal to the longitudinal directions of the tracks T, in response to a control or drive signal, so as to achieve initial phase error compensation and slant tracking error compensation. In addition to such compensations, it is necessary to effect a track tracing operation in order to perform overlap-tracing or interval-tracing. Overlap-tracing is required in a slow-motion playback mode employing a tape speed slower than the recording speed, and in which the head repeatedly traces or scans a recorded track and then the head scans the next track on the tape. Interval-tracing or skip-tracing is required in a fast-motion playback mode employing a tape speed faster than the recording speed, and in which one or several tracks are skipped and the head only scans the tracks at intervals.

For reproducing the video signals, upper rotary drum 2 is rotationally driven at a frequency of 30 revolutions per second by drum motor 6 and, at the same time, tape 1 is longitudinally driven by capstan 7 and its associated pinch roller at a predetermined tape speed. The rotational speed of capstan motor 8, which corresponds to the tape speed, is detected by a frequency generator 9, which produces a speed detected pulse signal FG which, for example, in the normal (+1) reproducing mode, has a frequency of 1920 Hz. Further, as the tape is moved longitudinally, control pulses CTL recorded at the lower edge of the tape are reproduced by a control head 10 and supplied to a CTL amplifier 11 which produces the CTL pulses at its output.

In addition, the rotational phase of drum motor 6 is detected by a PG (pulse generator) head 12 which produces PG pulses corresponding thereto and supplies the same to a head change-over pulse forming circuit 13. The latter circuit, in turn, produces head change-over pulses RF-SW for controlling the operation of the heads 4A and 4B, respectively. In particular, the head change-over pulses RF-SW are supplied to an RF switch 14 which is also supplied with the reproduced RF signals from heads 4A and 4B. In this manner, when the head change-over pulses RF-SW are at a high level, during the scanning by head 4A, the RF signal reproduced thereby is supplied at the output of switch 14, while when the head change-over pulses are at a low level, during the scanning by head 4B, the reproduced RF signal therefrom is supplied at the output of switch 14 so as to produce a composite RF signal.

The reproduced composite RF signal from switch 14 is supplied to a high-pass filter 15 for deriving the FM luminance component therefrom which is then demodulated by an FM demodulator circuit 16 and supplied to an adder 19. The reproduced RF signal from switch 14 is also supplied to a low-pass filter 17 for deriving the chrominance component therefrom which is then converted to a higher frequency band by a balanced modulator circuit 18 in response to a frequency converting carrier signal having a frequency $f_c$ and which is also supplied to the modulator circuit. The frequency converted chrominance component is then supplied to adder 19 where it is added or mixed with the demodulated luminance component and the combined signal from adder 19 is supplied as a reproduced video signal to a television receiver. In addition, the output of switch 14 is supplied to an envelope detecting circuit 20, from which an amplitude-modulation component (envelope signal) e included in the RF signal is obtained. The output of envelope detecting circuit 20 includes information regarding the amount and direction of the tracking error of the actual scanning path of the heads 4A and 4B relative to the recorded tracks.

Figure 2A:
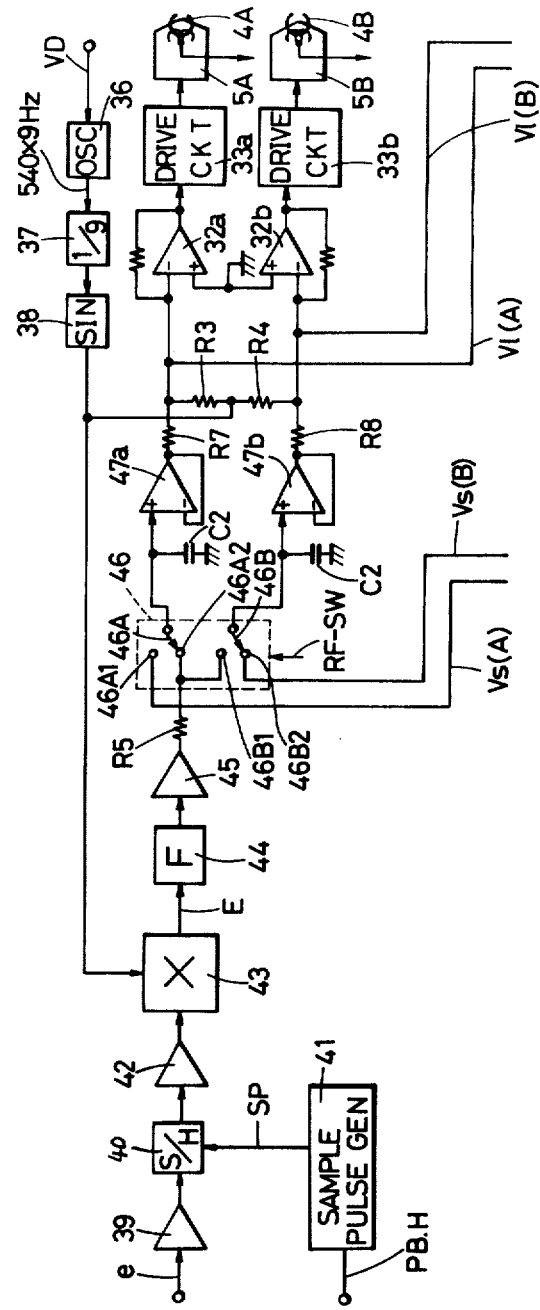
FIGS. 2A-2C are block diagrams of a tracking control system according to one embodiment of this invention.
Figure 2B:
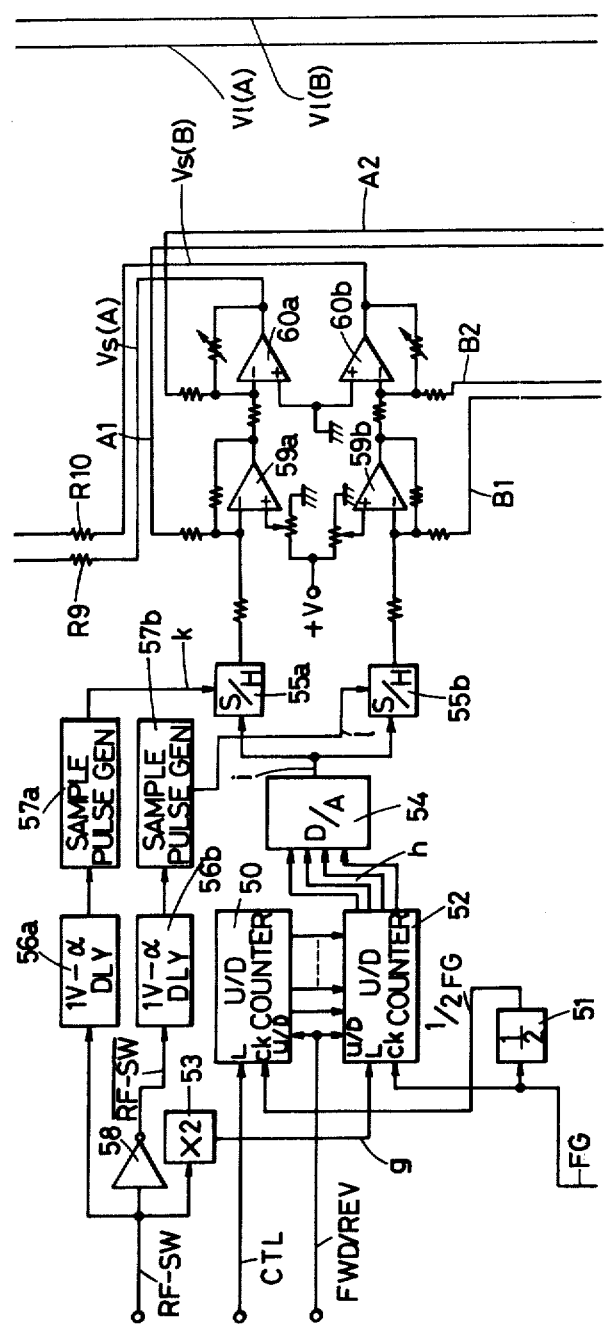
Figure 2C:
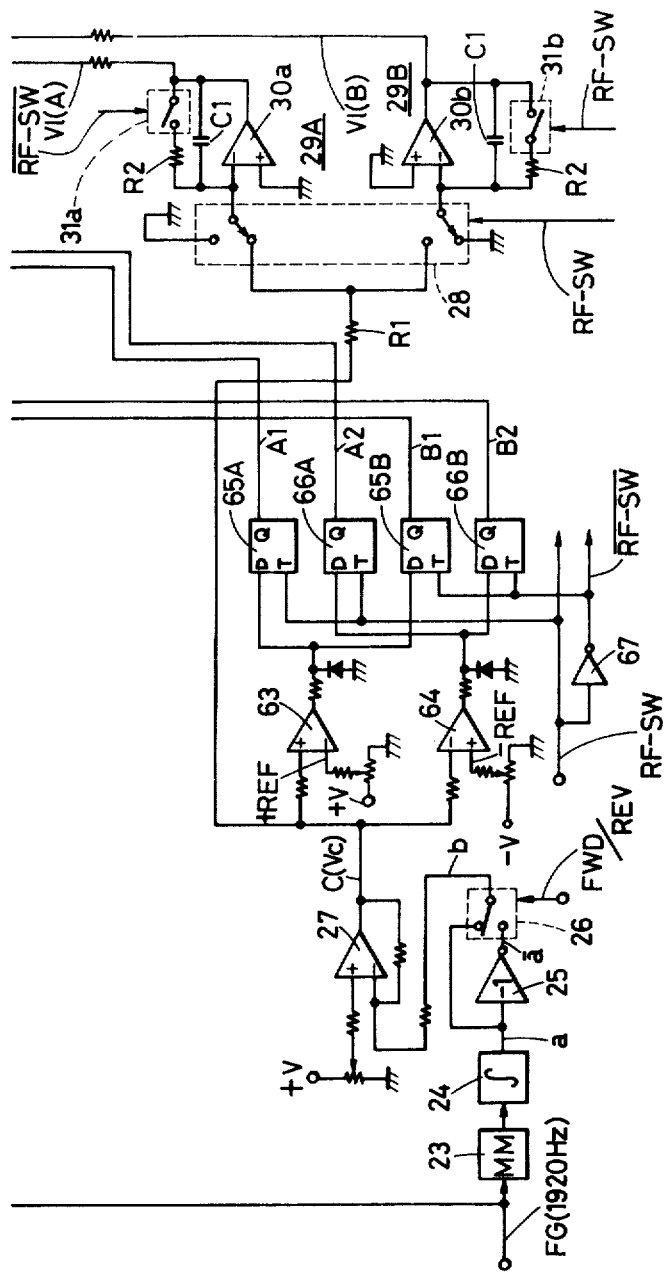
Figure 3A:
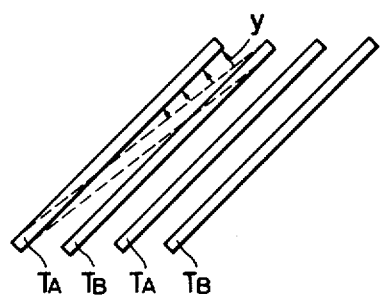
FIG. 3A is a schematic diagram illustrating the relationship between the recorded tracks and the head scanning path during the still reproducing mode.
Figure 3B:
FIG. 3B is a waveform diagram illustrating the deflection waveform applied to the bi-morph leaf for correcting the scanning path of the reproducing head during the reproduction mode of FIG. 3A.
Figure 4A:
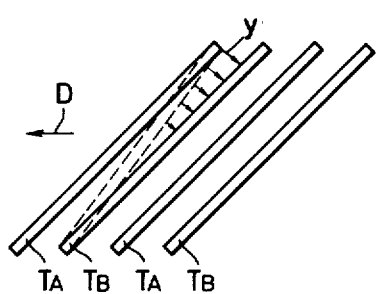
FIG. 4A is a schematic diagram illustrating the relationship between the recorded tracks and the head scanning path during the +2 fast-forward reproducing mode.
Figure 4B:
FIG. 4B is a waveform diagram illustrating the deflection waveform supplied to the bi-morph leaf for correcting the scanning path of the reproducing head during the reproduction mode of FIG. 4A.

A tracking control system according to an embodiment of this invention is shown in FIGS. 2A–2C. However, before proceeding with a description thereof, the slant angle correction necessary for accurate scanning by the heads will first be discussed. As previously discussed, during non-normal reproducing modes, the scanning by heads 4A and 4B is askew with respect to the record tracks desired to be scanned. In particular, as shown in FIG. 3A, in the still reproducing mode, heads 4A and 4B scan the tape along the path shown in broken lines in FIG. 3A which is offset or askew with respect to record tracks $T_A$ and $T_B$ previously recorded on the tape. It should be appreciated that the distance along the tape in the lengthwise direction thereof from the beginning of the scanning path indicated by broken lines in FIG. 3A to the end thereof is greater than the distance along the tape in the lengthwise direction thereof from the beginning of any record track $T_A$ or $T_B$ to the end thereof by a distance corresponding to one pitch measured between adjacent record tracks. Accordingly, bi-morph leaves 5A and 5B must be controlled in a direction y (FIG. 3A) which is normal to the head scanning direction so as to correct such slant angle error. Generally, as will be discussed in more detail hereinafter, heads 4A and 4B have their positions controlled to correct such slant angle error by means of a saw-tooth shaped deflection signal (FIG. 3B) supplied to bi-morph leaves 5A and 5B. In like manner, in the +2 fast-forward reproducing mode in which the tape travels in the forward direction at a speed two times the normal reproducing speed, the scanning path of each of heads 4A and 4B is increasingly shifted in the direction of arrow D in the tape running direction so as to scan the path shown in broken lines in FIG. 4A. As in the still-reproducing mode, the distance along the tape in the lengthwise direction thereof from the beginning of the scanning path indicated by broken lines in FIG. 4A to the end thereof is greater than the distance along the tape in the lengthwise direction thereof from the beginning of any record track $T_A$ or $T_B$ to the end thereof by a distance corresponding to one pitch measured between adjacent record tracks. To compensate for this error in the slant angle, a saw-tooth shaped deflection signal, shown in FIG. 4B, which has an opposite polarity to that produced in the still reproducing mode, is supplied to bi-morph leaves 5A and 5B to correct the positions of heads 4A and 4B in a direction y shown in FIG. 4A. Thus, to effect a slant angle correction, bi-morph leaves 5A and 5B are supplied with one of the saw-tooth signals shown in FIGS. 3B and 4B with the gradient of such signal being determined in accordance with the tape speed. As previously discussed, the tape speed is detected by frequency generator 9 which produces a speed detected pulse signal FG having a frequency of 1920 Hz in the normal reproducing mode of operation.

Figure 6A:
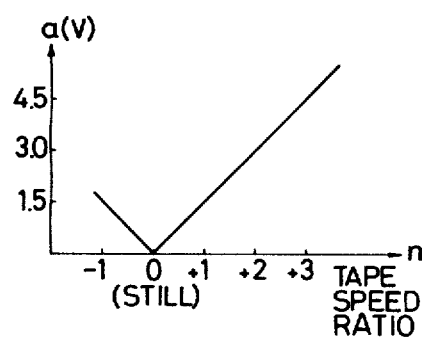
FIGS. 6A-6D are graphical diagrams illustrating the relationship between the tape speed ratio and detected voltages of respective portions of the tracking control system of FIG. 2C.

Referring now to FIG. 2C, there is shown a slant angle correction circuit which forms part of the tracking control system according to this invention. As shown therein, the slant angle correction circuit includes a monostable multivibrator 23 supplied with the pulse signal FG (FIG. 5A) from frequency generator 9 and which, in turn, produces an output signal having a predetermined pulse width, as shown in FIG. 5B. This latter signal is fed to an integrator circuit 24 which produces a DC voltage a as the tape speed detecting voltage, as shown in FIG. 5C. If the tape speed ratio n is defined as the actual reproducing tape speed divided by the recording or normal reproducing (+1) tape speed, a graph of the level of the DC voltage a verses the tape speed ratio n can be constructed as shown in FIG. 6A. It should be appreciated that, in the still-reproducing mode when the magnetic tape 1 is not moving (n=0), the tape speed detected voltage a is equal to 0. Thus, the tape speed detected voltage a increases for any movement of the tape, regardless of the direction of movement thereof. In other words, the tape speed detected voltage a fails to take into consideration the direction of movement of the magnetic tape.

Figure 6B:
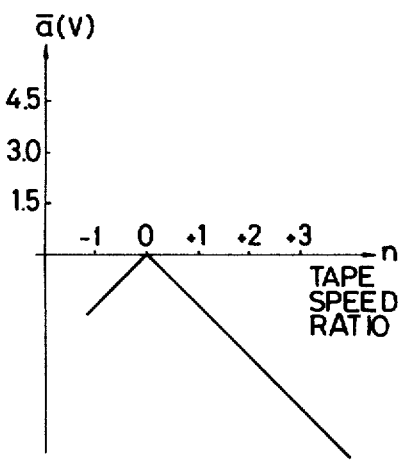

Accordingly, the tape speed detected voltage a is supplied to an inverter 25 to produce an inverted tape speed detected voltage $\bar{a}$, the relationship thereof with respect to the tape speed ratio n being shown in FIG. 6B. The detected voltages a and $\bar{a}$ are supplied to respective fixed terminals of a switch circuit 26 having a movable arm which contacts one of the fixed terminals in accordance with a forward/reverse direction signal FWD/REV. For example, direction signal FWD/REV is at logic level "1" when the tape is running in the forward direction whereby the movable arm is controlled to pass the tape speed detected voltage a through switch circuit 26, and is at logic level "0" when the tape is running in the reverse direction whereby the movable arm is controlled to pass the inverted tape speed detected voltage a through switch circuit 26. It should therefore be appreciated that switch circuit 26 produces a tape speed detected voltage b which is a function of both the actual tape speed and the tape speed direction. The relationship between the tape speed detected voltage b and the tape speed ratio n is shown in FIG. 6C.

Figures 6C, 6D:
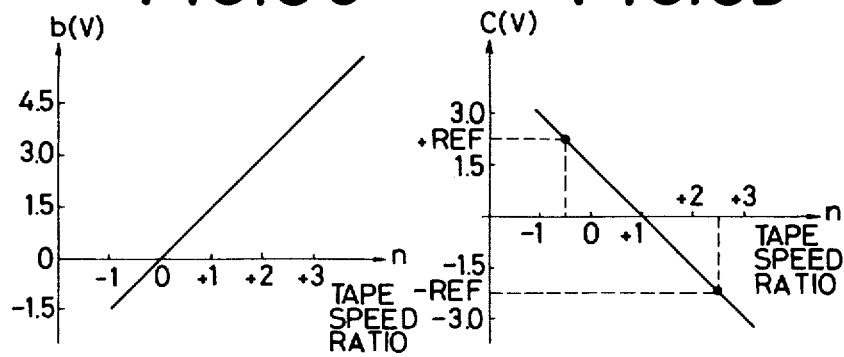

An operational amplifier 27 is supplied with the tape speed detected voltage b at its inverting input, and is supplied with a variable voltage at its non-inverting input so as to produce a tape speed detected voltage c which is offset or shifted with respect to detected voltage b, as shown particularly in FIG. 6D. Thus, the tape speed detected voltage c has a value equal to 0 in the normal reproducing mode whereby no slant angle correction is effected. It should be appreciated that the detected voltage c corresponds to the amount and direction of the actual tape speed. In particular, the detected voltage c increases in the negative direction when the tape speed is increased from the normal (+1) reproducing speed in the forward reproducing direction, and positively increases when the tape speed is decreased from such normal reproducing speed, for example, during the reverse mode of operation.

The tape speed detected voltage c is supplied to integrating circuits 29A and 29B for the A- and B-channels through a resistor R1 and a switch circuit 28, the latter being controlled by the head change-over pulses RF-SW (FIG. 7A). In particular, during scanning by head 4A, integrating circuit 29A is supplied with the tape speed detected voltage c, and during scanning by head 4b, integrating circuit 29B is supplied with the tape speed detected voltage c. Integrating circuits 29A and 29B are constituted by operational amplifiers 30a and 30b, respectively, having their non-inverting inputs grounded and their inverting inputs supplied with the tape speed detected voltage c. Each integrating circuit 29A and 29B further includes a feedback capacitor C1 connected between the output of the respective operational amplifier and the inverting input thereof and which is used for integration, the integration constant of the integrating circuits thereby being determined by feedback capacitor C1, input resistor R1 and the tape speed detected voltage c. Accordingly, a sawtooth shaped voltage $V_I$ is alternately obtained as a slant angle correction signal from integrating circuits 29A and 29B, as shown in FIGS. 7B(A) and 7C(B), respectively, as follows:

$$V_I = V_c/C1 \cdot R1 t \qquad \ldots (1),$$

where $V_c$ is the voltage level of the tape speed detected voltage c. It should therefore be appreciated that the gradient of the saw-tooth shaped voltage $V_I$ is proportional to the level $V_c$ of the tape speed detected voltage c.

Further, a series combination of a discharging resistor R2 and a switch circuit 31a is connected in parallel with the feedback capacitor C1 of integrating circuit 29A, and a series combination of a discharging resistor R2 and a switch circuit 31b is connected in parallel with the feedback capacitor C1 of integrating circuit 29B. Resistors R2 are provided for discharging capacitors C1 to reset integrating circuits 29A and 29B. In particular, switch circuit 31b of integrating circuit 29B is closed in response to the head change-over pulses RF-SW supplied thereto, during scanning by head 4A, and switch circuit 31a of integrating circuit 29A is closed in response to inverted head change-over pulses $\overline{\text{RF-SW}}$ supplied thereto, during scanning by head 4B. Thus, the integrated outputs from integrating circuits 29A and 29B are gradually attenuated during the non-scanning operation of heads 4A and 4B, respectively, as indicated by the broken lines in FIGS. 7B and 7C, with the rate of such attenuation or reset being determined by a time constant which is a function of resistor R2 and capacitor C1. By providing such gradual reset of the voltage produced by integrating circuits 29A and 29B, bi-morph leaves 5A and 5B attain a stable operating condition prior to the next respective scan by heads 4A and 4B, respectively. The failure to provide discharging resistors R2 would result in capacitors C1 instantaneously discharging, as shown by the solid trailing edges of the signals in FIGS. 7B and 7C. However, with such abrupt resetting action, bi-morph leaves 5A and 5B may oscillate at a resonant frequency and thereby have an adverse effect during a subsequent scanning period by their respective heads 4A and 4B.

The saw-toothed shaped slant angle correction signal $V_I$ has a gradient corresponding to the respective tape speed, as shown in FIG. 8, where the numerals in parenthesis correspond to a multiplication factor of the tape speed in the recording or normal reproducing mode and the "+" or "−" sign in front of the numerals corresponds to the forward or reverse directions of movement. For example, the slant angle correction signal $V_I$ (+3) corresponds to a tape speed in the forward direction which is 3 times the tape speed in the recording or normal reproducing mode. The slant angle correction signals $V_I$ from integrating circuits 29A and 29B are supplied to the inverting inputs of operational amplifiers 32a and 32b, respectively, as shown in FIG. 2A. The outputs of these latter circuits are supplied to drive circuits 33a and 33b which supply output signals $V_A$ and $V_B$ to deflect bi-morph leaves 5A and 5B to correct any slant angle error between the scanning paths of heads 4A and 4B and the record tracks $T_A$ and $T_B$. In this manner, the scanning paths and the recorded tracks substantially coincide so that a reproduced picture having substantially no guard band noise is produced.

In addition, the bi-morph leaves are supplied with a wobbling of dithering signal w having a frequency $f_0$, for example, $f_0 = 540$ Hz, so that as magnetic heads 4A and 4B accurately scan each of the record tracks, they are wobbled transversely with respect to the longitudinal direction of the record tracks at the frequency $f_0$. The wobbling of heads 4A and 4B at a frequency of 540 Hz corresponds approximately to a peak-to-peak deviation of 10 μm of the heads along the tracks. As a result, the RF or FM signals reproduced by heads 4A and 4B are subjected to amplitude modulation at the wobbling or dithering frequency $f_0$. In this manner, the direction and amount of tracking error between the recorded tracks and the scanning by the heads is obtained from the amplitude-modulated components of the reproduced outputs from the heads. In particular, an external reference vertical synchronizing signals VD having a frequency of 60 Hz is supplied as a trigger pulse to an oscillator 36 (FIG. 2A) which produces an oscillation output having a frequency of 4860 Hz. The oscillation output is then frequency divided by 9 in a frequency divider 37 to produce an oscillation signal having a frequency of 540 Hz which is converted into a sinusoidal signal as the wobbling or dithering signal w by a sine waveform generator circuit 38. The wobbling or dithering signal w is supplied through resistors R3 and R4 to the inverting inputs of amplifiers 32a and 32b, respectively, where it is added with the slant angle correction signal $V_I$.

As previously discussed, the reproduced RF signals from heads 4A and 4B are supplied to an envelope detecting circuit 20, from which an amplitude-modulation component (envelope signal) e included in the RF signals is obtained. The output of detecting circuit 20 includes information regarding the amount and direction of the tracking error of the actual scanning path relative to the recorded tracks. The output or envelope signal e is supplied through an amplifier 39 to a sample-and-hold circuit 40 which receives sampling pulses SP in synchronism with the reproduced horizontal synchronizing pulses PB·H from a sample pulse generator 41. Thus, sample-and-hold circuit 40 samples the output of envelope detecting circuit 20 at each sampling pulse SP and holds the sampled value until the receipt of the next sampling pulse SP. It should be appreciated that, since each of the outputs from heads 4A and 4B is a frequency modulated (FM) wave, in recording/reproducing systems having a frequency gain characteristic, the FM wave is subjected to an amplitude modulation in accordance with the content of the picture, that is, the brightness signal. However, since the envelope signal e from detecting circuit 20 is sampled and held by sample-and-hold circuit 40 in response to each sampling pulse SP which is in synchronization with the horizontal synchronizing pulses PB·H, an amplitude-modulation component which is not affected by the content of the picture is obtained from circuit 40.

The value sampled by sample-and-hold circuit 40 is supplied to one input of a multiplier circuit 43 through an amplifier 42, and the wobbling or dithering signal w is supplied to another input of multiplier circuit 43. Accordingly, the output of sample-and-hold circuit 40 is multiplied by the wobbling signal w in multiplier circuit 43 which functions as a synchronous detector. The level and polarity of the output of multiplier circuit 43 corresponds to the amount and direction of deviation of heads 4A and 4B from the track then being scanned and is hereinafter referred to as the tracking error signal E. This latter signal is supplied to an amplifier 45 through a filter circuit 44 which functions as a trap filter for eliminating components having a frequency $2f_0$ which are generated in multiplier circuit 43. The output of amplifier 45 is fed through a resistor R5 to a switch circuit 46 for supplying the tracking error signal E to control the operation of bimorph leaves 5A and 5B.

As shown in FIG. 2A, switch circuit 46 has movable arms or contacts 46A and 46B adapted to engage fixed terminals 46A1 and 46A2 and fixed terminals 46B1 and 46B2, respectively, in response to head change-over pulses RF-SW supplied thereto. When the head change-over pulses RF-SW are at logic level "1" (during scanning by head 4A), movable arm 46A contacts fixed terminal 46A2 to supply the tracking error signal E through a voltage follower circuit 47a and a resistor R7, to be added with the slant angle correction signal $V_I$ and the wobbling or dithering signal w at the inverting input of operational amplifier 32a. Voltage follower circuit 47a is constituted by an operational amplifier and the tracking error signal E is supplied to the non-inverting input thereof. At this time, the movable arm or contact 46B of switch circuit 46 contacts fixed terminal 46B2 so that a jump signal or phase error correcting voltage $V_s(B)$, as will be described hereinafter, is supplied from switch circuit 46 through a voltage follower circuit 47b and a resistor R8 to the inverting input of operational amplifier 32b. It should be appreciated, that no slant angle correction signal $V_f(B)$ is supplied at this time so that the phase error correcting voltage (jump signal) $V_s(B)$ is only added to the wobbling or dithering signal w at the inverting input of operational amplifier 32b. As described in regard to voltage follower circuit 47a, voltage follower circuit 47b is constituted by an operational amplifier supplied with the phase error correcting voltage $V_s(B)$ at its non-inverting input. Accordingly, during scanning by head 4A, the deflection of bi-morph leaf 5A is controlled by tracking error signal E, wobbling or dithering signal w and slant angle correction signal $V_f(A)$. Also, at this time, the deflection of bi-morph leaf 5B is only controlled by the wobbling or dithering signal w and the phase error correcting voltage $V_s(B)$ supplied to fixed terminal 46B2.

In like manner, when the head change-over pulses RF-SW are at logic level "0" during scanning by head 4B, the movable arm or contact 46B of switch circuit 46 contacts fixed terminal 46B1 to supply the tracking error signal E to the B-channel. At this time, movable arm 46A contacts fixed terminal 46A1 to supply the phase error correcting voltage $V_s(A)$ to the A-channel.

In addition, capacitors C2 are connected between ground and the respective non-inverting inputs of operational amplifiers 47a and 47b as integrating capacitors, whereby the tracking error signal E has its error voltage integrated by a time constant determined by resistor R5 and capacitor C2. However, the phase error correcting voltage $V_s$ is supplied to fixed terminal 46A1 through a resistor R9 and to fixed terminal 46B2 through a resistor R10, so that the phase error correcting voltage $V_s$ supplied thereto is integrated by a time constant which is determined by resistor R9 or R10 and capacitor C2. By providing capacitors C2, during non-scanning by the respective heads, bi-morph leaves 5A and 5B are prevented from being abruptly deflected by the phase error correcting voltage $V_s$ so as to gradually preset the heads prior to the scanning thereby and to prevent any adverse resonant vibrations thereof.

Further, when heads 4A and 4B are going to scan a path which is not parallel to the tracks $T_A$ and $T_B$, a maximum deflection of $\pm\frac{1}{2}$ pitch (one pitch is equal to the distance between adjacent recorded tracks) is the most that may be required to move the head onto the starting point of a recorded track to be traced from its tracing path. In other words, when the head is centered between adjacent tracks at the start of its scanning movement, the phase error is maximum and may be corrected by $\pm\frac{1}{2}$ pitch deflection. If the arrangement is such that the head can be deflected to both sides of a track $T_A$ or $T_B$ by bi-morph leaves 5A and 5B which are controlled to selectively bend upward and downward from their neutral positions, a head deflection amplitude of one pitch, in its peak-to-peak value is necessary for effecting the phase compensation irrespective of the tape speed during reproduction. It is therefore necessary to predict the phase error in advance so that each head can be preset or jumped to a suitable position during its non-scanning period to reduce any phase difference between the position of the particular head and the corresponding track to be scanned at the beginning of the head scanning operation.

Referring now to FIG. 2B, there is shown a phase error correcting or jump signal forming circuit which includes an UP/DOWN counter 50 having a load input terminal L supplied with the control pulses CTL. As shown in FIGS. 9A and 9B, the positions of the positive control pulses CTL are, for example, coincident with the leading edges S of tracks $T_A$ formed on magnetic tape 1. It should be appreciated that the period of the reproduced CTL signal is determined by the tape speed, but that the number of pulses in the detected pulse signal FG produced during one period of the CTL signal is always constant regardless of the tape speed. For example, since upper rotary drum 2 rotates at a speed of 30 revolutions per second and since the frequency of the detected pulse signal FG is 1920 Hz during the normal reproducing mode, the number of FG pulses during each period of the CTL signal is always equal to 64. Thus, the FG pulses are frequency divided by two in a frequency-dividing circuit 51 so that 32 of such pulses occur during each period of the CTL signal, as shown in FIG. 9D, and are supplied to the clock input terminal CK of UP/DOWN counter 50. UP/DOWN counter 50 is preferably of the type that counts from 0 to 15 so as to count 16 of the $\frac{1}{2}$ FG pulses from frequency-dividing circuit 51, and is designed to count to its center value 8 at the occurrence of each control pulse CTL supplied to the load input terminal L thereof. Counter 50 also has an UP/DOWN input terminal U/D supplied with the direction signal FWD/REV corresponding to the tape transporting direction. In particular, counter 50 counts in an UP direction when the direction signal is at logic level "1" and in a DOWN direction when the direction level is at logic level "0".

Accordingly, UP/DOWN counter 50 produces a saw-tooth shaped output, as shown in FIG. 9C, having a period of one track pitch, with the center of its inclined portion being coincident with the control pulse CTL supplied thereto. In other words, the beginning and ends points defining the inclined portion of the output define a range of $\pm\frac{1}{2}$ pitches in the longitudinal direction of the tape. It should be appreciated that the signal shown in FIG. 9C corresponds to forward movement of the tape, that is, when the direction signal FWD/REV is at logic level "1", and that reverse movement of the tape would result in the gradient of the output of counter 50 being opposite to that shown in FIG. 9C.

Further, the jump signal forming circuit shown in FIG. 2B includes an UP/DOWN counter 52 which also counts between 0 and 15 and has a clock input terminal CK supplied with the FG pulses from frequency generator 9. It should be appreciated that the pulses supplied to the clock input terminal CK of counter 52 have a frequency twice that of the pulses supplied to the clock input terminal CK of counter 50 so that counter 52 counts from 0 to 15 at a rate twice that of counter 50, as shown in FIG. 9E. Further, counter 52 includes a load input terminal L supplied with field pulses g (FIG. 9G) from a frequency doubler 53 which doubles the frequency of the head change-over pulses RF-SW (FIG. 9F) supplied thereto. Also, as with counter 50, counter 52 includes an UP/DOWN input terminal U/D supplied with the direction signal FWD/REV for controlling the direction of the count by counter 52. When each of the field pulses g is supplied to the load input terminal L of counter 52, the counted value of counter 50 is preset into counter 52. This results in counter 52 producing an output signal h by adding the saw-tooth shaped waveform of FIG. 9E to the saw-tooth shaped waveform of FIG. 9C, as shown in FIG. 9H.

It should be appreciated that the tape speed for the example shown in FIGS. 9A and 9B is for the +0.25 slow-motion reproducing mode so that one period of the CTL signal corresponds to a four-frame period, and the period of the head change-over pulse signal RF-SW is equal to one frame period. The voltage level of the saw-tooth shaped signal of FIG. 9C corresponds to the phase difference between the starting point of the scan by heads 4A and 4B and the leading edges S of a tracks to be scanned. Thus, if the dots on the waveform of FIG. 9C correspond to the sampling points for head 4A and the X-marks correspond to the sampling points for head 4B, the phase difference between the scanning start points of heads 4A and 4B and the leading edges S of the tracks to be scanned can be obtained. For example, if the voltage level corresponding to the first dot on the waveform of FIG. 9C is supplied to counter 52 during the occurrence of a field pulse g, counter 52 produces the same voltage level, which corresponds to the phase difference between the starting point of the scan of head 4A and the leading edge S of track $T_A$, at a time which is one field period prior to the start of the scanning operation by head 4A. In other words, the level of the output signal h of FIG. 9H, at the leading edge of the first head change-over pulse RF-SW (indicated by the first occurrence of A in FIG. 9F), that is, at a position corresponding to the first dot on the waveform of FIG. 9C, is the same as the level for the waveform of FIG. 9C at the trailing edge of that same pulse, that is, at a position corresponding to the first dot thereon. Thus, the phase difference between the head scanning path and the track to be scanned is determined at a time which is one field period prior to the scanning operation of that head, that is, during the non-scanning period of that head. It should be appreciated that such information can be used to preset or jump each head to a suitable position in advance of the scanning operation thereby so that the phase difference between the head scanning path and the track to be scanned is eliminated.

In this regard, the output signal h of counter 52 is supplied to a digital-to-analog (D/A) converter 54 where it is converted into a saw-tooth shaped waveform i, as shown in FIG. 9I, and is then supplied to sample-and-hold circuits 55a and 55b for the A- and B-channels, respectively. Further, the head change-over pulses RF-SW, redrawn in FIG. 9J, are supplied through a delay circuit 56a to a sample pulse generating circuit 57a which produces sampling pulses k, as shown in FIG. 9K, which are generated at positions advanced from the leading edges of pulses RF-SW by 1V-α, where V is a vertical scanning or field period and α is an extremely small time period. The saw-tooth shaped waveform i of FIG. 9I is therefore sampled in sample-and-hold circuit 55a during the occurrence of the sampling pulses k at positions indicated by dots in FIG. 9I. In this manner, the phase difference between the scanning position of head 4A and the track to be scanned, at the beginning of the scanning operation thereby, can be determined at a time approximately one field period before the scanning operation by head 4A.

In like manner, head change-over pulses RF-SW are inverted by an inverter 58 to produce inverted pulses $\overline{\text{RF-SW}}$ which are supplied through a delay circuit 56b to a sample pulse generating circuit 57b which, in turn, produces sampling pulses 1, as shown in FIG. 9L. Delay circuit 56b has the same delay characteristic as delay circuit 56a so that sampling pulses 1 are generated at a position which is advanced from the trailing edges of head change-over pulses $\overline{\text{RF-SW}}$ by 1V-α. The sampling pulses 1 are supplied to sample-and-hold circuit 55b for sampling the waveform shown in FIG. 9I at positions indicated by X-marks in FIG. 9I. In this manner, the phase difference between the scanning position of head 4B and the track to be scanned, at the beginning of the scanning operation thereby, can be determined at a time approximately one field period prior to the scanning operation by head 4B.

The output from sample-and-hold circuit 55a, which corresponds to the phase difference for the A-channel, is supplied as a phase error correcting voltage or jump signal $V_s(A)$ through inverting amplifiers 59a and 60a and a resistor R9 to the fixed terminal 46A1 of switch circuit 46, as previously discussed. The output of sample-and-hold circuit 55b, which corresponds to the phase difference for the B-channel, is supplied as a phase error correcting voltage or jump signal $V_s(B)$ through inverting amplifiers 59b and 60b and a resistor R10 to the fixed terminal 46B2 of switch circuit 46. It is to be remembered that switch circuit 46 supplies the phase error correcting voltages $V_s$ to bi-morph leaves 5A and 5B of the A- and B-channels during the non-scanning periods of the respective heads so as to preset heads 4A and 4B to their correct or zero positions at the beginning of the scanning operation thereby. Accordingly, heads 4A and 4B correctly scan the tracks previously recorded on the magnetic tape.

Referring now to FIG. 10, there is shown a theoretical waveform diagram of the supply or drive voltages for deflecting the bi-morph leaves for various tape speeds. As previously discussed, the maximum range of voltages that can be applied to the bi-morph leaves for obtaining linear deflection is ±200 V, as indicated by the dashed lines in FIG. 10. The double arrow P in FIG. 10 corresponds to the supply voltage necessary for a deflection of ±½ pitches, that is, the range of the phase error correcting voltage. Thus, for example, in the +2 fast-forward reproducing mode, a voltage of approximately 100 V may be required for effecting a maximum deflection of one track pitch in the forward direction. In like manner, in the still-reproducing mode, a voltage of approximately −100 V is required for deflection of one track pitch in the reverse direction.

From FIG. 10, it is seen that the +3 fast-forward reproducing mode and the −1 reverse-motion reproducing mode may require voltages of +200 V and −200 V, respectively, to be applied to the bi-morph leaves for obtaining maximum deflection thereof. However, it is possible that, due to, for example, the electric characteristics and configurations of the bi-morph leaves, a supply voltage of greater than +200 V and less than −200 V may be required to be applied to the bi-morph leaves in the +3 fast-forward reproducing mode and in the −1 reverse-motion reproducing mode, respectively, to obtain the same maximum deflection shown theoretically in FIG. 10. As previously discussed, the application of voltages outside the range ±200 V to the bi-morph leaves may result in a non-linear deflection thereof. Consequently, the possible tape reproducing speeds have been restricted within the range of −0.5 times the recording speed in the reverse direction to +2.5 times the recording speed in the forward direction. Accordingly, the tracking control system according to the present invention provides an offset signal to the bi-morph leaves to provide a supplemental offset or jump of ± one track pitch when the tape speed ratio n exceeds the range of −0.5 in the reverse direction or +2.5 in the forward direction so as to increase the possible tape speed during reproduction in the range of −1 to +3 times the normal reproducing speed while maintaining linear deflection of the bi-morph leaves.

Referring back to FIG. 2C, there is shown an offset signal forming circuit for producing an offset signal when the reproducing tape speed exceeds the range of −0.5 to +2.5 times the normal reproducing speed and which adds the offset signal to the jump signal applied to the bi-morph leaves. As shown therein, the offset signal forming circuit includes comparator circuits 63 and 64 which are each constituted by an operational amplifier. In particular, comparator circuit 63 is constituted by an operational amplifier having its inverting input supplied with a positive reference voltage +REF and its non-inverting input supplied with the tape speed detecting voltage c (FIG. 6D). In like manner, comparator circuit 64 is constituted by an operational amplifier having its non-inverting input supplied with a negative reference voltage −REF and its inverting input supplied with the tape speed detecting voltage c. Comparator circuit 63 is operative to detect when the tape speed ratio n is less than or equal to −0.5, that is, n ≦ −0.5. When such condition is detected, comparator circuit 63 produces a logic level "1" output and, at all other times, produces a logic level "0" output. In like manner, comparator circuit 64 is operative to detect when the tape speed ratio n is greater than or equal to +2.5, that is, n ≧ +2.5. When such condition is met, comparator circuit 64 produces a logic level "1" output and, at all other times, produces a logic level "0" output. The output of comparator circuit 63 is supplied to the D-input terminals of D flip-flop circuits 65A and 65B, while the output of comparator circuit 64 is supplied to the D-input terminals of D flip-flop circuits 66A and 66B. The trigger input terminals T of flip-flop circuits 65A and 66A, corresponding to the A-channel, are supplied with the head change-over pulses RF-SW, and these latter pulses are also supplied through an inverter 67 to the trigger input terminals T of flip-flop circuits 65B and 66B for the B-channel, as inverted pulses $\overline{\text{RF-SW}}$.

Thus, for example, if the tape speed in the forward direction is changed at a time $t_o$ from +2 times the normal reproducing speed to +3 times the normal reproducing speed, as shown in FIG. 11A, comparator circuit 64 produces a logic level "1" output supplied to the D-input terminals of flip-flop circuits 66A and 66B. In this manner, flip-flop circuit 66A is set at the trailing edges of the head change-over pulses RF-SW (FIG. 11A) and flip-flop circuit 66B is set at the trailing edges of the inverted pulses $\overline{\text{RF-SW}}$. Consequently, flip-flop circuit 66A produces an output signal A2 (FIG. 11C) which changes from logic level "0" to logic level "1" at the first trailing edge of the head change-over pulses RF-SW after the change in speed from the +2 reproducing mode to the +3 reproducing mode. The high level output signal A2 is supplied to the inverting input of operational amplifier 60a of the phase error correcting or jump signal forming circuit of FIG. 2B where it is added at a fixed ratio to the phase error correcting voltage also supplied thereto. In this manner, the output of amplifier 60a modifies the phase error correcting voltage $V_s(A)$ so as to further offset or jump bi-morph leaf 5A, and consequently magnetic head 4A, by one track pitch in the negative direction, as shown by the solid downwardly sloping line in FIG. 11B. In other words, during the non-scanning or preset period of head 4A, this head is offset by an additional track pitch in the negative direction. Thus, even in the +3 fast-forward reproducing mode, the voltage applied to bi-morph leaf 5A never exceeds the allowable voltage of +200 V. Without such offset operation, head 4A would be preset in accordance with the downwardly sloping dashed line in FIG. 11B and accordingly, a voltage greater than +200 V would be applied to bi-morph leaf 5A during the +3 fast-forward reproducing mode, as shown by the upwardly sloping dashed line in FIG. 11B.

In like manner, flip-flop circuit 66B is set at the leading edges of the change-over pulses RF-SW, that is, at the trailing edges of the inverted pulses $\overline{\text{RF-SW}}$ and, in response thereto, produces an output B2 at logic level "1", as shown in FIG. 11E. This signal B2 is combined with the phase error correcting voltage $V_s(B)$ for the B-channel at the inverting input of operational amplifier 60b of the jump signal forming circuit of FIG. 2B. Consequently, during the preset period for head 4B, the phase error correcting voltage $V_s(B)$ is modified so as to offset or jump bi-morph 5B by an extra track pitch in the negative direction, as shown in FIG. 11D. Accordingly, in the +3 fast-forward reproducing mode, bi-morph leaves 5A and 5B have a drive voltage applied thereto which is within the allowable operating range of ±200 V to obtain linear deflection thereof.

When the tape speed is varied at a time $t_o$ from the still-motion reproducing mode to the −1 reverse-motion reproducing mode, comparator circuit 63 produces a logic level "1" output which is supplied to the D-input terminals of flip-flop circuits 65A and 65B. Accordingly, flip-flop circuit 65A is set at the trailing edges of head change-over pulses RF-SW (FIG. 12A) to produce a logic level "1" output signal A1 (FIG. 12C) which is added to the phase error correcting voltage $V_s(A)$ at the inverting input of operational amplifier 59a of the jump signal forming circuit of FIG. 2B. Consequently, the phase error correcting voltage $V_s(A)$ is modified so that bi-morph leaf 5A is offset by one track pitch in the positive direction during the preset period for head 4A, as shown in FIG. 12B. In this manner, the voltage applied to bi-morph 5A never goes below −200 V so as to achieve linear deflection of bi-morph leaf 5A in the −1 reverse-motion reproducing mode.

In like manner, flip-flop circuit 65B is set at the leading edges of head change-over pulses RF-SW, as shown in FIG. 12E, so that a logic level "1" output signal B1 (FIG. 12E) is supplied to the inverting input of operational amplifier 59b of the jump signal forming circuit of FIG. 2B. Thus, bi-morph leaf 5B is offset by one track pitch in the positive direction during the preset period thereof.

The dynamic range of the VTR is therefore increased to operate within the range of −1 reverse-motion reproducing mode to the +3 fast-forward reproducing mode while maintaining linear deflection of the bi-morph leaves. It should be appreciated that various modifications within the scope of this invention may be made. For example, the present invention can be applied to a one-hand helical scan-type VTR, as well as the above-described two-head helical scan-type VTR.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Apparatus for reproducing information signals recorded in successive parallel tracks on a record medium while the latter is advanced at a predetermined speed in a direction at an angle to the direction along said tracks, said apparatus comprising:

transducer means movable along each of the tracks in a scanning path from a beginning end to a concluding end thereof for reproducing the signals recorded therein;

transducer deflecting means for deflecting said transducer means in a direction transverse to the direction along the tracks;

drive signal means for producing a drive signal controlling said transducer deflecting means to deflect said transducer means for accurately moving along said tracks during a scanning operation thereby; and phase compensation means for producing a phase compensation signal controlling said transducer deflecting means so as to preset said transducer means to the beginning of each track to be scanned during a non-scanning operation thereby, said phase compensation means including offset control means for producing an offset control signal as part of said phase compensation signal only when the speed of advancement of the record medium during reproducing is outside a predetermined range of speeds.

2. An apparatus according to claim 1; in which said offset when produced, cause signal controls the transducer deflecting means to deflect the transducer means by one track pitch to maintain the operation of said transducer deflecting means in a linear operating range thereof.

3. An apparatus according to claim 1; in which said offset control means includes first detection means for producing a first detected signal when the speed of advancement of the record medium during reproducing is beyond one limit of said predetermined range of speeds, second detection means for producing a second detected signal when the speed of advancement of the record medium during reproducing is beyond another limit of said predetermined range of speeds, signal forming means for producing said offset control signal in response to said first and second detected signals.

4. An apparatus according to claim 3; further including speed detecting means for producing a speed detected signal corresponding to the speed of advancement of the record medium during reproducing; and in which said first detection means includes first comparator means for comparing said speed detected signal with a first reference signal for producing said first detected signal, and said second detection means includes second comparator means for comparing said speed detected signal with a second reference signal for producing said second detected signal.

5. An apparatus according to claim 3; in which said signal forming means includes first flip-flop means for producing said offset control signal in response to said first detected signal and second flip-flop means for producing said offset control signal in response to said second detected signal, and inverter means for inverting said offset control signal from one of said first and second flip-flop means.

6. An apparatus according to claim 5; in which said transducer means includes first and second magnetic heads alternately movable along each of the tracks in a scanning path from a beginning end to a concluding end thereof for reproducing the signals recorded therein; further including position means for producing a position signal corresponding to the positions of said first and second magnetic heads in respect to said tracks; and in which said first flip-flop means includes a first flip-flop circuit for producing said offset control signal in response to said first detected signal and said position signal during the non-scanning operation of said first magnetic head and a second flip-flop circuit for producing said offset control signal in response to said first detected signal and said position signal during the non-scanning operation of said second magnetic head, and in which said second flip-flop means includes a third flip-flop circuit for producing said offset control signal in response to said second detected signal and said position signal during the non-scanning operation of said first magnetic head and a fourth flip-flop circuit for producing said offset control signal in response to said second detected signal and said position signal during the non-scanning operation of said second magnetic head.

7. An apparatus according to claim 6; in which said inverter means includes a first inverter amplifier for inverting the offset control signal produced by said first flip-flop circuit and a second inverter amplifier for inverting the offset control signal produced by said second flip-flop circuit.

8. An apparatus according to claim 6; in which said first, second, third and fourth flip-flop circuits are each constituted by a D-type flip-flop circuit having a trigger input terminal responsive to the position signal and an information input terminal supplied with the respective one of said first and second detected signals.

9. An apparatus according to claim 1; in which said drive signal means includes slant angle correction means for producing a slant angle correction signal as part of said drive signal in response to the speed of advancement of the record medium during reproducing so as to correct any inclination tracking error of said transducer means during the scanning operation thereby.

10. An apparatus according to claim 9; in which said slant angle correction means includes speed detecting means for producing a speed detected signal corresponding to the speed of advancement of the record medium during reproducing, and integrating means for producing said slant angle correction signal in response to said speed detected signal.

11. An apparatus according to claim 10; in which said slant angle correction means includes speed signal adjustment means for adjusting said speed detected signal to have a zero level when the speed of advancement of the record medium during reproducing is the same as that for recording, with the level of the adjusted speed detected signal increasing for decreasing speeds of advancement during reproducing and decreasing for increasing speeds of advancement during reproducing.

12. An apparatus according to claim 11; in which said transducer means includes first and second magnetic heads movable along each of the tracks in respective scanning paths, and said transducer deflecting means includes first and second transducer deflecting elements for deflecting said first and second magnetic heads, respectively; and in which said integrating means includes first and second integrating circuits supplied with said adjusted speed detected signal during the scanning operations of said first and second magnetic heads, respectively, for producing said slant angle correction signal which is applied to said first and second transducer deflecting elements during the scanning operations of said first and second magnetic heads, respectively.

13. An apparatus according to claim 12; in which each of said first and second integrating circuits includes an operational amplifier having an inverting input supplied with said adjusted speed detected signal and a capacitive element connected between the inverting input and the output of the respective operational amplifier, with said slant angle correction signal being produced at the outputs of the first and second operational amplifiers during the scanning by the first and second magnetic heads, respectively.

14. An apparatus according to claim 13; in which each of said first and second integrating circuits includes a resistive circuit connected in parallel with each capacitor element during the non-scanning operations by the respective heads for resetting the respective integrating circuits.

15. An apparatus according to claim 1; in which said drive signal means includes phase error correcting means for producing a phase error correcting signal to eliminate any phase error between said transducer means and the beginning of the tracks to be scanned thereby, during the non-scanning operation of said transducer means.

16. An apparatus according to claim 15; in which one field interval of information signals is recorded in each of said tracks; said record medium has control signals recorded thereon corresponding to the positions of at least some of the tracks recorded therein; said apparatus further includes speed detecting means for producing a speed detected signal corresponding to the speed of advancement of the record medium during reproduction; and in which said phase error correcting means includes counter means for producing a counted output signal having a level corresponding to the phase difference between the scanning path of said transducer means and the beginning of a track to be scanned, said level occurring at a time which is one field period prior to the scanning operation of said transducer means, and sampling means for sampling the counted output signal of said counter means at said time which is one field period prior to the scanning operation of said transducer means for producing said phase error correcting signal.

17. An apparatus according to claim 16; in which said counter means includes a first counter for producing an output signal in response to said control pulses and said speed detected signal and a second counter for producing said counted output signal in response to said control pulses, said speed detected signal and the output signal of said first counter.

18. An apparatus according to claim 17; in which said first counter is an UP/DOWN counter having a load input terminal supplied with said control pulses, a clock input terminal supplied with said speed detected signal after the latter has been frequency divided by two, and an UP/DOWN input terminal supplied with a direction signal corresponding to the direction of advancement of the record medium during reproduction, and said second counter is an UP/DOWN counter adapted to be preset with the output signal of said first counter and having a load input terminal supplied with a position signal corresponding to the position of said transducer means, a clock input terminal supplied with said speed detected signal, and an UP/DOWN input terminal supplied with said direction signal for producing said counted output signal.

19. An apparatus according to claim 18; in which said transducer means includes first and second magnetic heads movable along each of the tracks in respective scanning paths, and said transducer deflecting means includes first and second transducer deflecting elements for deflecting said first and second magnetic heads, respectively; and said sampling means includes first and second sample pulse generating means for producing first and second sampling pulses, and first and second sample-and-hold circuits for sampling the counted output signal in response to said first and second sampling pulses, respectively, to produce said phase error correcting signal.

20. An apparatus according to claim 19; in which said first sample pulse generator means includes first delay means for delaying said position signal by approximately one field period and a first sample pulse generator circuit for producing said first sampling pulses in response to the output of said first delay circuit, and said second sample pulse generator means includes inverter means for inverting said position signal, second delay means for delaying said inverted position signal by approximately one field period, and a sample pulse generator circuit for producing said second sampling pulses in response to said delayed, inverted position signal.

21. An apparatus according to claim 20; in which said first sample-and-hold circuit produces said phase error correcting signal during the non-scanning operation of said first magnetic head and said second sample-and-hold circuit produces said phase error correcting signal during the non-scanning operation of said second magnetic head.

22. An apparatus according to claim 1; in which said information signals include horizontal sychronizing signals; and in which said drive signal means includes means for producing a dithering signal as part of said drive signal, and tracking error signal forming means for producing a tracking error signal as part of said drive signal, said tracking error signal forming means including envelope detecting means for producing an amplitude-modulation component from said signals reproduced by said transducer means, sampling means for sampling said amplitude-modulation component at the occurrence of each horizontal synchronizing signal, and synchronous detection means for synchronously detecting the sampled amplitude-modulation component with said dithering signal to produce said tracking error signal.

23. An apparatus according to claim 1; in which said drive signal means includes tracking error signal forming means for producing a tracking error signal, and said phase compensation means includes phase error correcting means for producing a phase error correcting signal; and further including switch means for supplying said phase error correcting signal to said transducer deflecting means during the non-scanning operation of said transducer means and for supplying said tracking error signal to said transducer deflecting means during the scanning operation of said transducer means.

* * * * *